March 23, 1954  R. A. HARTMAN ET AL  2,672,905
FASTENING DEVICE
Original Filed Jan. 28, 1948
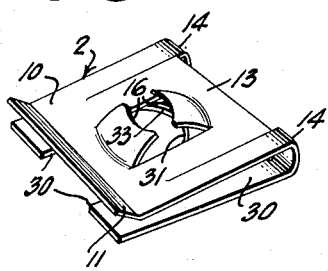
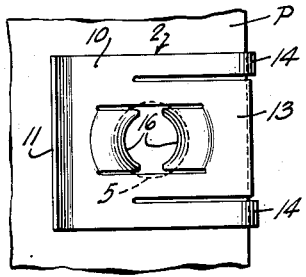
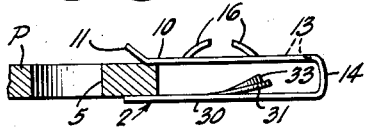
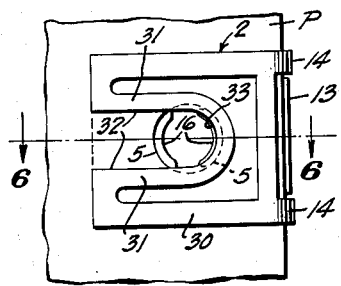
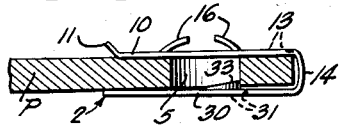
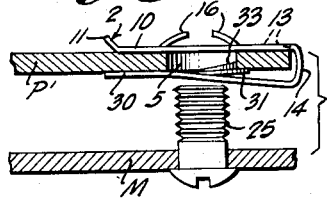
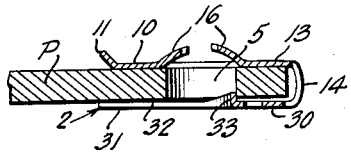
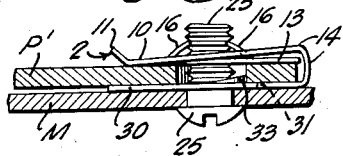
INVENTOR
RICHARD A. HARTMAN
LAURENCE H. FLORA
BY *H. G. Lombard*
ATTORNEY

Patented Mar. 23, 1954

2,672,905

UNITED STATES PATENT OFFICE 2,672,905

FASTENING DEVICE

Richard A. Hartman and Laurence H. Flora, Cleveland, Ohio, assignors to Tinnerman Products, Inc., Cleveland, Ohio, a corporation of Ohio Original application January 28, 1948, Serial No. 4,914. Divided and this application December 11, 1950, Serial No. 200,280

2 Claims. (Cl. 151—41.75)

This invention relates in general to fastening installations and deals, more particularly, with improvements in fasteners having attaching means for holding the fasteners in an assembly prior to the application of a cooperating part thereto for completing the installation. This application is a division of prior copending application Serial Number 4,914, filed January 28, 1948, and since issued as U. S. Patent Number 2,581,481, dated January 8, 1952.

In the general construction of clasp type fasteners, such as attachable nut devices and the like, the fasteners are provided in various designs to comprise a pair of arms adapted to clasp a part adjacent a stud passage therein to hold the fastener in position for receiving a bolt or screw to secure such part in an installation. Heretofore, any such fastener designed to clasp a part of a certain thickness in the use thereof has been more or less limited to use on parts of such specific thickness due to the fact the fastener would not seat properly on parts of other thicknesses nor clasp the same with the necessary degree of clamping pressure required for proper function of the fastener. For example, in securing a plate or panel, it has been the general practice to space the arms of the fastener with the precise spacing required to provide a snug fit between the arms and the opposite sides of the plate or panel. Consequently, a fastener so designed for clasping a part of specific thickness is not adapted to operate satisfactorily on parts of other thicknesses.

A primary object of the invention, therefore, is to provide an attachable fastener of the kind described which is adapted to be used satisfactorily with parts of different thicknesses and which is otherwise designed to seat properly on any such part in the most effective manner for its intended fastening purpose.

A further object of the invention is to provide an attachable nut, or like fastener, adapted to be attached to parts of considerably different thicknesses, comprising a simplified sheet metal device defining a pair of spaced body portions for embracing an apertured part together with a resilient spring arm provided on one of said body portions and cooperating with the other body portion in a manner to adapt the fastener to the thickness of such part in order to seat the fastener in its most effective and proper fastening position thereon.

Another object of the invention is to provide a fastener of this character which includes a locking detent serving as an indexing or positioning means that is easily and quickly applied to the aperture in said part through the medium of a sight opening adjacent said detent for guiding the fastener to attached position.

A further object is to provide a fastener of this kind having such indexing means which is designed to center the fastener in attached position over a stud opening in a part and otherwise lock the fastener automatically in said attached fastening position.

A more specific object is to provide such a fastener in which the indexing and locking means is provided on the spring arm of the fastener that adapts the fastener to the thickness of the part to which the fastener is attached.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a perspective view of a fastener adapted for attachment to parts of different thicknesses in accordance with the invention;

Fig. 2 discloses the fastener of Fig. 1 in side or edge elevation as initially applied to a part of relatively thick dimension, represented in section;

Fig. 3 is a similar view showing the fastener of Fig. 2 in fully attached position;

Fig. 4 is a top plan view of Fig. 3 showing the bolt or screw engaging means of the fastener;

Fig. 5 is a bottom plan view of Fig. 3 showing the design of the locating and locking means for retaining the fastener of Figs. 1 to 4, inclusive, in applied fastening position;

Fig. 6 is a sectional view of Fig. 5, as along line 6—6, looking in the direction of the arrows;

Fig. 7 shows the same fastener of Figs. 1 to 6, inclusive, as applied to fastening position on a part of relatively thin dimension together with a cooperating bolt or screw about to be applied thereto to complete the installation; and, Fig. 8 is a similar view showing the installation of Fig. 7 as completed and illustrating the disposition of the fastener in such a completed installation.

In general, a fastening device in accordance with the present invention is best provided from any suitable sheet metal material, preferably tempered spring metal or cold rolled metal having spring-like characteristics. The fasteners are most economically provided by generally rectangular blanks obtained from standard sheet metal strip stock with little loss or waste of material. The fastener comprises a floating, resilient spring arm serving as a yieldable take-up means which adapts the fastener for attachment to apertured plates, panels, or other articles of different thicknesses, together with attaching means including a locking detent serving as an indexing or positioning means and an adjacent sight opening which facilitates application of the fastening device to attached fastening position on an apertured part. While the invention is disclosed in connection with attachable nut devices, it will be appreciated that as respects the clasp type of attaching means for attaching the fastener to parts of different thicknesses, the invention is not limited to such use, but rather, is equally adapted to various other applications and uses for attaching a fastener designed to support a cable, molding or other object in an installation.

Referring now, more particularly, to the drawings, one form of the improved fastening device of the invention, designated generally 2, is shown constructed of a section of sheet metal strip material having a U-shaped bend defining a body portion 10 and a return bent body portion 30. These body portions 10, 30, are spaced apart a distance corresponding to the range of thickness of parts with which the fastener is intended for use. The body portion 10 is provided with a pair of longitudinal slits providing a spring arm 13 between side portions 14 which define the generally U-shaped formation of the fastener and connect the body portions 10, 30, in predetermined spaced relation, as aforesaid.

The resilient spring arm 13 is provided with a thread opening defining means for threadedly engaging a bolt or screw. Preferably such a thread opening is defined by a pair of cooperating tongues 16, or the like, provided by a pair of spaced parallel slits on opposite sides of an aperture forming a passage for the bolt or screw. The thread engaging tongues 16 illustrate only one form of such thread engaging means which may be employed, and it is to be understood that the present invention is not limited in any manner or form to the specific construction of such thread engaging means 16, but rather, contemplates also, any related form of thread engaging tongues or equivalent thread engaging means.

The thread engaging elements 16 are best provided from the sheet metal material of the spring arm 13 by an aperture intermediate spaced parallel slits which form cooperating tongues, or the like, having spaced extremities lying on a helix and defining the desired thread or thread opening corresponding substantially to the root of the bolt or screw for threadedly engaging the thread thereof. Said tongues 16 otherwise are preferably formed to project out of the plane of the spring arm 13 and are bent lengthwise in substantial ogee formation to provide for the maximum strength obtainable to withstand the tightening action of the bolt or screw as it is advanced to final applied fastening position.

Such thread engaging means may be pressed, stamped, extruded, or otherwise provided on the fastener in any suitable form or construction so long as the same threadedly engage with the thread of the bolt or screw and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging the bolt or screw. However, such thread engaging means prepared in the form of cooperating, yieldable tongues as shown, are possessed of unusual inherent strength and will not collapse or pull through when the bolt is tightened, nor loosen under continuous strain and vibration in the installation. This takes place by reason of the fact that the sheet metal material from which such tongues are formed is of less thickness than the pitch or spacing between adjacent thread convolutions of the bolt or screw, wherefore the extremities of said tongues tend, more effectively, to move toward each other and dig into the grooves intermediate adjacent thread convolutions of the bolt when tightened and otherwise become embedded in the root of the bolt in locked, frictional fastening engagement therewith. Thus, in the present example, the tongues are shown as extending out of the plane of the arm 13 in substantial ogee formation, and provided preferably with arcuately notched extremities, forming substantial biting jaws designed to cut into the root of the bolt and the adjacent thread surfaces thereon in positive locking relation therewith in the most effective manner.

The other body portion 30 of the fastener is defined by a return bent end of the blank in a generally U-shaped form to approximate the length of the body portion 10. As best seen in Fig. 5, the free end of the body portion 30 is provided with a cutout area defining a spring arm 31 having an elongate sight opening 32 and an upstanding projection or detent 33 formed by a bent marginal portion of the inner end of the sight opening 32. Preferably, said detent 33 is thus formed from a marginal edge portion of the sight opening 32 to define a generally semi-circular indexing or positioning element which snugly engages the wall of a circular bolt opening 5 in part P to retain the fastening device in attached position thereon. The locking detent 33 preferably has its upper edge surface tapered generally downwardly toward the free end of the body portion 30 to define an inclined cam surface.

The inclined cam surface of the locking detent 33 provides a flared entrance to the space between the body portions 10, 30, which facilitates the initial application thereof to a part P by causing a gradual outward camming of said detent 33 as necessary to clear the edge of said part easily and quickly. In the initially applied position of the fastener, the sight opening 32, Fig. 5, at the free end of body portion 30 leaves the bolt passage 5 in the part P uncovered and fully visible such that the fastening device may be guided readily, in the least amount of time and effort, to its proper attached position in which said locking detent 33 snaps into said bolt opening 5, in the fully applied fastening position of the fastening device on said part P, Fig. 3, or P', Fig. 7. The locking detent 33 preferably is semi-circular and thereby snugly engages a material edge portion of the circular bolt opening 5 to lock the fastening device in attached position while otherwise leaving a sufficiently large passage for receiving any suitable bolt or screw fastener 25, Fig. 7, for example.

The body portion 30 of the fastener, accordingly, appears substantially as seen in Fig. 5, and preferably an outwardly flared lip 11 is formed on the free end of said body portion 10 to facilitate the initial application of the clip over the edge of part P as shown in Fig. 2. The body portion 30 otherwise is provided with the spring arm 31, carrying the detent 33, bent to extend inwardly between the spaced body portions 10, 30, in normal untensioned relation, as also shown in Fig. 2.

Accordingly, referring to Figs. 2, 3, and Figs. 7, 8, it will be understood that the fastener, thus provided, is readily adapted to be attached to the relatively thick part P, Figs. 2 and 3, or the relatively thin part P', Figs. 7, 8, or any other part having a thickness within the range of use of the fastener. In the initial application of the fastener, Fig. 2, the outwardly flared lip 11 on the body portion 10 facilitates the introduction of the part P between the spaced body portions 10, 30, while the slot 32, Fig. 5, is used as a sight opening to guide the detent 33 toward the bolt opening 5. As the fastener is pushed to home position shown in Figs. 3 and 8, the spring arm 31 cams the edge of said part and gradually yields as necessary to accommodate the thickness thereof and permit said part to be fully received between the spaced body portions 10, 30, of the fastener. In any case, as shown in Figs. 3 and 7, said resilient spring arm 31 and the opposing body portion 10 engage opposite sides of the part P or P' to retain the fastener in attached fastening position. It will be appreciated, therefore, that the improved fastener has a wide range of application to parts of different thicknesses by virtue of the arrangement of the spring arm 31 to extend free between the spaced body portions 10, 30, and thereby serve as a yieldable take-up means which adapts the fastener for attachment to a part of any particular thickness, and with the locking detent 33 on said spring arm engaging the adjacent wall of the bolt opening 5 in any such part P or P' to lock the fastener in such attached position.

In instances where the thickness of the part P approximates the spacing between the body portions 10, 30, as shown in Figs. 3 and 6, the spring arm 13 in the outer body portion 10 automatically seats in substantially flush engagement with said part and with the thread engaging means 16 properly positioned for most effective application of the bolt or screw 25 thereto in a direction generally normal to said part P.

However, when the fastener is applied to a relatively thin part P', as shown in Fig. 7, the side portions 14 of the fastener project beyond the inner surface of the part P' with the spring arm 13 carrying the thread engaging means 16 extending free between said side portions 14. Accordingly, when the member M to be secured is brought flush against the part P', as shown in Fig. 8, the spring arm 31 moves into the plane of body portion 30 while the other spring arm 13 is adapted to pivot relatively to said side portions 14 to bear evenly against part P' so that the thread engaging elements 16 thereon are suitably disposed for threadedly engaging the bolt or screw 25 in the most effective and proper manner in which said screw is applied generally normal to the base of said spring arm 13. Thus, when the bolt or screw 25 is applied as shown in Fig. 8, the spring arm 13 pivots inwardly into the space between the spaced body portions 10, 30, to bear evenly on the part P' as the side portions 14 are moved outwardly from the position of Fig. 7 to the position of Fig. 8 in which the member M is drawn up flush against said part P' and secured firmly and rigidly in the completed installation.

The fastening device in any form preferably is constructed of relatively thin sheet metal, the thickness of which is selected accordingly to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means.

While the invention has been described in detail with specific examples, such examples are intended as illustrations only, inasmuch as it will be apparent that other modifications in the construction, arrangement and general combination of parts may be provided without departing from the spirit and scope of the invention.

What is claimed is:

1. A fastener comprising a sheet metal device having a bent portion providing a pair of spaced body portions extending in the same general direction and adapted to receive therebetween any of several apertured parts of different thicknesses, spring arms stamped in said body portions having free ends extending toward said bent portion, one of said spring arms being bent to extend inwardly toward the other body portion and being adapted to yield in accordance with the thickness of the part to which the fastener is applied to cooperate with said other body portion of the fastener in engaging opposite sides of said part in the fastening position of the fastener thereon, said inwardly bent spring arm having a passage for a bolt or screw and a detent adjacent said passage projecting inwardly toward said other body portion and receivable in an aperture in a part to retain the fastener in fastening position on said part, and bolt or screw engaging means carried by the other spring arm for securing a member to said part.

2. A fastener comprising a sheet metal device having a bent portion providing a pair of spaced body portions extending in the same general direction and adapted to receive therebetween any of several apertured parts of different thicknesses, spring arms stamped in said body portions having free ends extending toward said bent portion, one of said spring arms being bent to extend inwardly toward the other body portion and being adapted to yield in accordance with the thickness of the part to which the fastener is applied to cooperate with said other body portion of the fastener in engaging opposite sides of said part in the fastening position of the fastener thereon, said inwardly bent spring arm having a lengthwise slot defining a passage for a bolt or screw and an arcuate detent at the end of said slot projecting inwardly toward said other body portion and receivable in a circular aperture in a part to retain the fastener in fastening position on said part, and bolt or screw engaging means carried by the other spring arm for securing a member to said part.

RICHARD A. HARTMAN.
LAURENCE H. FLORA.

References Cited in the file of this patent

UNITED STATES PATENTS

| Number | Name | Date |
| --- | --- | --- |
| 2,230,355 | Kost | Feb. 4, 1941 |
| 2,233,230 | Tinnerman | Feb. 25, 1941 |
| 2,255,469 | Kost | Sept. 9, 1941 |
| 2,358,890 | Tinnerman | Sept. 26, 1944 |
| 2,390,750 | Tinnerman | Dec. 11, 1945 |
| 2,581,481 | Hartman | Jan. 8, 1952 |